United States Patent [19]
Walls et al.

[11] Patent Number: 5,835,918
[45] Date of Patent: Nov. 10, 1998

[54] METHOD-MANAGEMENT SYSTEM AND PROCESS BASED ON A SINGLE MASTER MESSAGE FILE

[75] Inventors: Douglas Walls, Belmont; Kathryn Walker, Cupertino; Robert F. Mori, Menlo Park, all of Calif.

[73] Assignee: Sun Microsystems, Inc., Palo Alto, Calif.

[21] Appl. No.: 680,499

[22] Filed: Jul. 1, 1996

[51] Int. Cl.⁶ ...................................................... G06F 17/30
[52] U.S. Cl. ............................................................ 707/513
[58] Field of Search ..................... 345/336–338; 395/761–762, 701–703; 364/400; 707/513, 500, 509

[56] References Cited

U.S. PATENT DOCUMENTS

| | | | |
|---|---|---|---|
| 4,800,485 | 1/1989 | Ackroff et al. | 707/104 |
| 4,992,972 | 2/1991 | Brooks et al. | 345/338 |
| 5,148,541 | 9/1992 | Lee et al. | 707/2 |
| 5,243,519 | 9/1993 | Andrews et al. | 704/8 |
| 5,284,448 | 2/1994 | Nicol et al. | 345/337 |
| 5,452,206 | 9/1995 | Turriett et al. | 707/531 |
| 5,513,342 | 4/1996 | Leong et al. | 345/340 |

*Primary Examiner*—Anton Fetting
*Assistant Examiner*—Alford W. Kindred
*Attorney, Agent, or Firm*—Townsend and Townsend and Crew LLP

[57] ABSTRACT

A message management system produces files necessary for generating messages, localizing message catalogs, and displaying online help messages from a single master message file. Revisions and up-dates of the message system are performed by editing a single file, the master message file. A set of tools is provided to process the master message file to build the outputs.

10 Claims, 11 Drawing Sheets

THE TEMPLATE AT THE BEGINNING OF THE FILE LOOKS LIKE THIS:

```
-- SEVERITY [#MSGNO] MAG-TAG BRIEF-ERROR-TEXT
-[ SANITIZED-BRIEF-ERROR-TEXT
++ ERROR-EXPLANATION-HELP-TEXT
-+ VERBOSE-ERROR-TEXT
-# COMMENT
-@ TESTNAME-PATH
```

*FIG. 4A.*

| LEAD-IN CHAR | FIELD DESCRIPTION |
|---|---|
| - | NORMAL (STANDARD) ERROR TEXT. CONSISTS OF FOUR FIELDS: SEVERITY, #MSGNO, SYMBOLIC LINK, AND BRIEF-ERROR-TEXT. SEVERITY IS A NUMBER AND IS DEFINED AS A SEVERITY LEVEL FOR USE BY THE COMPILER. CURRENTLY, C DOES NOT USE THIS; IT IS SET TO 1. #MSGNO IS GENERATED AUTOMATICALLY BY THE ASSIGNMSGNO UTILITY. THERE ARE SOME NAMING RULES FOR THE SYMBOLIC LINKS, FOR EXAMPLE, A LINK MUST BEGIN WITH THE LETTER E, MUST CONSIST OF ALL UPPERCASE LETTERS, AND MUST BE UNIQUE. BRIEF-ERROR-TEXT IS THE ACTUAL TEXT OF THE COMPILER MESSAGE |
| -[ | ALTERNATIVE TEXT USED IN THE HELP SYSTEM FOR THE ERROR MESSAGE, FOR EXAMPLE, REPLACING THE PRINTF() DIRECTIVE SYMBOLS, LIKE %S |
| ++ | ERROR EXPLANATION HELP TEXT |
| -+ | VERBOSE ERROR TEXT (RESERVED FOR FUTURE USE) |
| -# | ERROR SOURCE FILE COMMENTS |
| -@ | COMMENT DOCUMENTING REGRESSION TEST WHICH STRESSES THIS MESSAGE |

*FIG. 4B.*

```
            ┌42  ┌44      ┌46                          ┌48
       -- 1 #258 E_UNDEFINED_SYMBOL undefined symbol: %s
       -[ undefined symbol
       ++ <newline>─50
       You have referred to a symbol for which there is no
       declaration in scope.

Example of code that generates the message:
       <vex>
       f(void){
       g(i);
       }
       <\vex>
```

FIG. 5.

```
                                                       ┌12(1)
       #ifndef _MSGNO_H
       #define _MSGNO_H
       /* Error Message Values -
        * This file was created automatically from the error
       description file.
        * Do not edit this file, edit the error description
       file:
        *    ../../inc/src/acomp_msg.txt
        */ typedef enum msgno_enum {
       MESSAGENOZEROISNOTUSED = 0,
       /*   ... Lots Deleted ... */
       E_UNDEFINED_SYMBOL,
       /*   ... Lots Deleted ... */
       MESSAGENOLASTISNOTUSED
       } msgno_t;

#endif /* _MSGNO_H */
```

FIG. 6.

```
#ifndef _MSGTXT_H
#define _MSGTXT_H

/* This file was created automatically from the error
description file.
 * Do not edit this file, edit the error description
file.
 */ include <stddef.h> struct I18N_mag_t {
    const unsigned int  severity;
    const int           catsetno;
    const int           catmsgno;
    const char *        tag;
    const char *        txt;
    const char *        help_tag;
};

static const struct I18N_msg_t I18N_msg[] = {
    { 0, 1, 0, "MESSAGENOZEROISNOTUSED*,
*Error: Message number 0 used*,
        NULL },
    /* Lots deleted ... */
    { 1, 1, 258, "E_UNDEFINED_SYMBOL",
        "undefined symbol: %s" ,
        "E-UNDEFINED-SYMBOL" },
    /* Lots deleted ... */
};

#endif /* _MSGTXT_H */
```

*FIG. 7.*

```
i18n.c defines these support routines:

#include "msgtxt.h"

extern void i18n_init(char *Path);  /* FindYourself
path
*/
extern void i18n_fini();
   /* msgno == symbolic handle */
extern const char * get_msg(int msgno);
extern const char * get_help_tag(int msgno);
extern const char * get_msg_tag(int msgno);
extern unsigned int get_msg_severity(int msgno);
extern msgno_t find_msg_enum( const char * tag, int
tagkind);
         /* via symbolic handle or help system topic
id
*/ extern nl_catd get_catd(void);   /* For License library
*/ i18n.h declares these macros and the above functions:

include <nl_types.h>
#define DEFAULT_SETNO  1
#define GETMSG(MSGNO)  get_msg(MSGNO)
#define NOI18N(MSG)    MSG
#define MSGTAG         1
#define MSGHELPTAG     2
```

```
% cc tst.c -c
(/tmp/1230510)tst.c:
<HTML>
<PRE>
<A HREF="editor:tst.c:4:0:error:undefined symbol:
a">"tst.c", line 4</A>: <A HREF="help:/set/dist/sparc-
S2/bin/../SC4.2/bin/../lib/locale/C/help/
SUNW_SPRO_SC.error_help.sdl:E-UNDEFINED-
SYMBOL:undefined symbol: a
"><IMG SRC="SUNW-internal-info-sign" ALT="???"></A>
undefined symbol: a
</PRE>
</HTML>
</HTML>
cc: acomp failed for tst.c
```

```
<otherfront id=E-UNDEFINED-SYMBOL><head>undefined
symbol
<newline>     50
You have referred to a symbol for which there is no
declaration in scope.

Example of code that generates the message:
<vex>
f(void){
g(i);
}
<\vex>

Message ID: <computer> E_UNDEFINED_SYMBOL <\computer>
<newline>----------------------------------------
...
```

FIG. 14.

```
<!entity ScriptResult FILE "msg_help.htg*>

<metainfo>
<title> Error and Warning Messages
&ScriptResult;
<\metainfo>
<hometopic>Error and Warning Messages
<list order tight>
<item><link E_UNDEFINED-SYMBOL Definition>E_UNDEFINED_
SYMBOL<\link> ...
```

FIG. 15.

```
undefined symbol

You have referred to a symbol for which there is no
declaration in scope.

Example of code that generates the message:

f(void){
g(i);
}
Message ID: E_UNDEFINED_SYMBOL
```

FIG. 16.

METHOD-MANAGEMENT SYSTEM AND PROCESS BASED ON A SINGLE MASTER MESSAGE FILE

BACKGROUND OF THE INVENTION

The present invention relates generally to the organization and maintenance of a message system and more particularly relates to a message system including an online help subsystem.

Many software systems, including for example compilers and other developer's products, include message documentation. For example, most C compilers include a debugging tool that generates error messages and other types of messages.

One of the challenges of writing software documentation, such as compiler documentation, is the large number of options and messages that users may want information about. In addition to making sure the documentation for hundreds of options and messages is up-to-date and current with the compiler source code from release to release, writers face documentation problems if the same material is documented in more than one place.

For example, for some compilers the messages are documented in a user guide, a quick reference document, and an ASCII README file. Thus, any changes to be made must be made consistently in all places.

Further, for products having international markets, the message documentation must be localized so that users can read the documentation in their native language. Thus, each source of documentation must be localized independently.

Localization systems for software are known to those of skill in the art. For example, U.S. Pat. Nos. 5,513,342, 5,243,519, and 5,148,541 disclose methods for localizing software. While such systems for localizing are known, the task of maintaining consistency between the various documentation components is an ongoing problem.

Additionally, since software, such as a compiler, is used on multiple different platforms it is desirable for a message system to be portable between platforms.

SUMMARY OF THE INVENTION

By virtue of the present invention, message text and supporting information is stored in a master file so that content of the master file can be made up-to-date and current with the compiler source code from release to release and maintenance is required for only the single master file. Help messages, error messages, and other messages are generated from this master file.

According to one aspect of the invention, the master message file includes entries for each message with each entry including a symbolic handle. Files produced from the master message file utilize the symbolic handles to organize message information. The files produced from the master message file include, for example, compiler header files included in a message processing interface, message files used to localize the error messages issued by the compiler, and an online help volume used to generate online help messages. If the message system is updated, only the master message file is edited and the output files are produced from the single master message file.

According to another aspect of the invention, compiler options are stored in a master file and other files needed to generate help messages are derived from the master file.

Other features and advantages will be apparent from the following detailed description and appended drawings.

DESCRIPTION OF THE PREFERRED EMBODIMENT

The following are definitions of terms that will be utilized below in the detailed description:

command line interface an interface to a computer and its user that utilizes text commands to interact with programs.

CATGETS( ) a C function which accesses an entry in the catalog identified by a number provided as a function argument.

GUI Graphical User Interface is an interface that utilizes displayed icons to represent commands and operations.

CDE Common Desktop Environment is a common windowing interface utilized for many programs. In the preferred embodiment on-line help is provided by CDE help volumes and help messages are displayed in help windows created by the CDE. The CDE utilizes documents in HelpTag format which is a form of SGML (Standard Generalized Markup Language). These are standard techniques described in reference manuals for each computer system, such as the Common Desktop Environment 1.0 Programmer's Guide by the CDE Documentation Group (IBM, HEWLETT-PACKARD, SUNSOFT, NOVELL) published by Addison-Wesley Publishing Co. Reading, Mass. (1995).

IPE Integrated Programming Environment is a software development tool including an editor, debugger, and performance analyzer.

Figure 1:
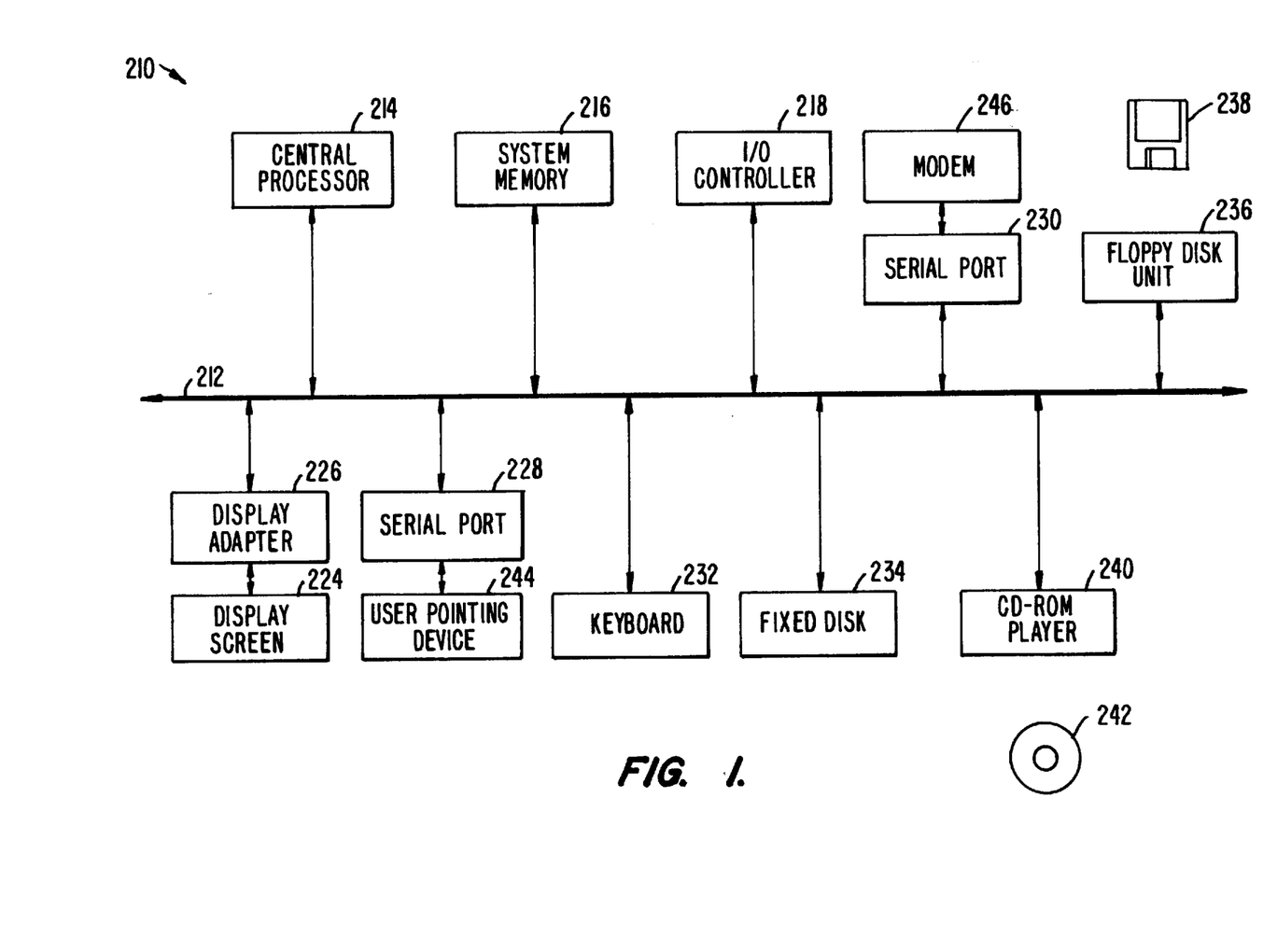
FIG. 1 is a block diagram depicting a computer system suitable for implementing the present invention.

FIG. 1 depicts a block diagram of a client computer system 210 suitable for implementing the present invention. Client computer system 210 includes a bus 212 which interconnects major subsystems such as a central processor 214, a system memory 216 (typically RAM), an input/output (I/O) controller 218, an external device such as a display screen 224 via display adapter 226, serial ports 228 and 230, a keyboard 232, a fixed disk drive 234 and a floppy disk drive 236 operative to receive a floppy disk 238, and a CD-ROM device 240 operative to receive a CD-ROM 242.

Many other devices can be connected such as a user pointing device, e.g., a mouse 244 connected via serial port 228 and a modem 246 connected via serial port 230. Modem 246 may provide a direct connection to a remote server via a telephone link or to the Internet via a POP (point of presence). Alternatively, some other type of network interface system (not shown) could be used.

Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application. Code to implement the present invention may be operably disposed in system memory 216 or stored on storage media such as fixed disk 234, floppy disk 238, or CD-ROM 242.

In the preferred embodiment, a message management system is implemented for a compiler having both a command line interface and an integrated programming environment (IPE).

Figure 2:
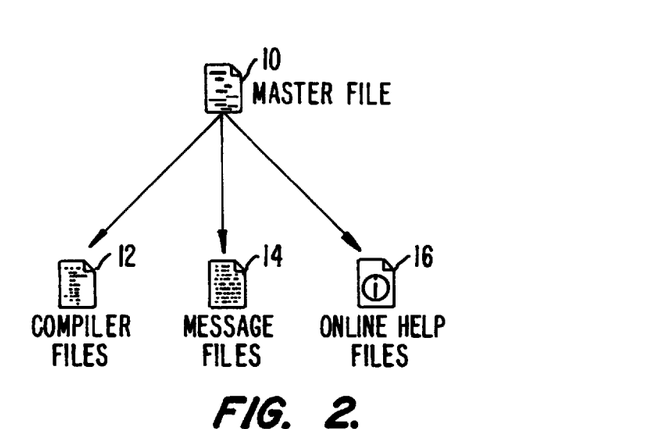
FIG. 2 is a diagram depicting the output files produced from the master message file.

FIG. 2 is a schematic diagram depicting an overview the file structure of the preferred embodiment. Referring to FIG. 2, a master message file 10 is an ASCII file that both engineers and technical writers can edit. The master message file 10 contains entries for every message in the system.

In the preferred embodiment the master message file is kept in the integration workspace of the compiler which is a common workspace where the latest versions of all files are maintained. Other engineers and writers who work on the master message file access the master message file from the integration workstation utilizing a program, such as TeamWare manufactured and distributed by Sun Microsystems, Inc., that coordinates the work of many programmers. An engineer edits an accessed copy of the master message file in a child workspace on his or her workstation. Each engineer utilizes the UNIX source code control system (SCCS) which facilitates keeping track of each revision of a document to avoid the confusion that often arises from having several versions of one file on line. SCCS is particularly useful when programs or documents are enhanced but the original (or any previous) version is still needed.

The engineer working on the master message file enters the text of a message directly into the master message file as described more fully below and when the engineer is finished working on the master message file in the child workspace the edited version is put back to the compiler's integration workspace. Thus, the master message file held in the integration workspace provides a single document for maintaining a consistent and coherent message system.

In FIG. 2, the output files based on the master message file 10 are header files 12 used by the compiler, message files 14 used to localize the error messages issued by the compiler, and an online help volume 16.

The outputs of the master message file 10 are built by utilizing a set of tools, which in the preferred embodiment are implemented as code stored on the various computer usable storage media of the computer system depicted in FIG. 1. These output files are generated by the tools during integration builds of the compiler to produce the latest versions of the files produced from the master message file 10. The integration builds are conducted periodically to update the files. At certain times versions of the compiler are released to customers.

Figure 3:
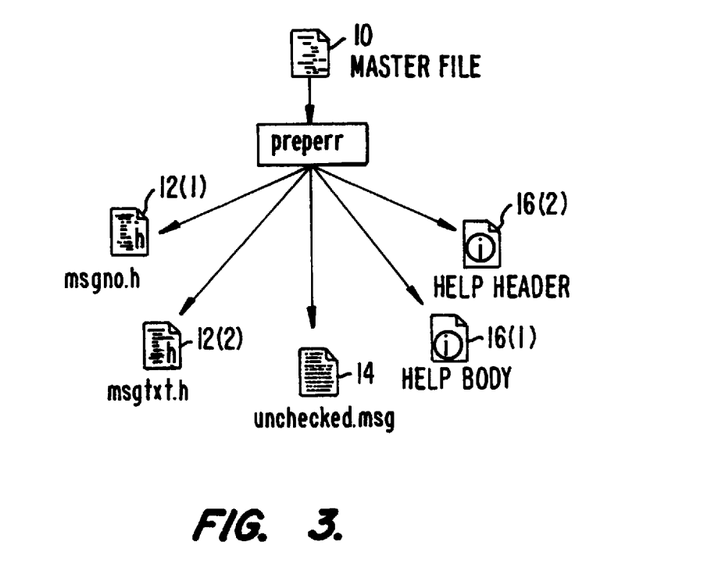
FIG. 3 is a diagram depicting initial master message file processing.

In the first step of processing, depicted in FIG. 3, a PREPERR tool operates on the master message file 10 to produces the header (.h) files 12, online help source (.htg) files 16, and the source (.msg) file 14 used to produce the message catalogs.

As described below, the online help files contain a Help Body (msg_help.htg of FIG. 14) 16(1) including help system topic IDs and help text and a Help Header 16(2) (SUNW_SPRO_SC.error_help.htg of FIG. 10) in HelpTag format is used by the CDE help volume build tools to build a help volume and ASCII online help files.

The message file contains a message catalog source file (unchecked.msg) to be passed to the localization teams for production of message catalogs. In the preferred embodiment the message catalog is converted to a binary file with each message entry associated with a number. When performing localization CATGETS( ) is used by the compiler to allow for localization of the compiler messages.

The compiler header files contain an enumeration 12(1) (msgno.h of FIG. 6) of the symbolic handles to the messages and an array 12(2) (msgtxt.h of FIG. 7) containing all the information about a message indexed by an enumerated symbolic handle.

Figure 4A:
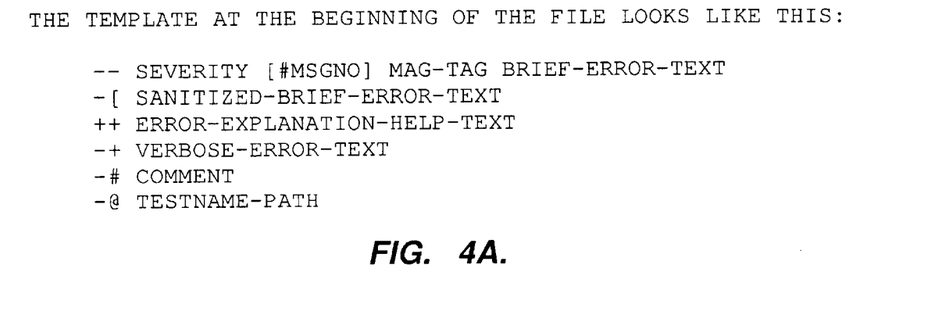
FIG. 4A is a diagram of a master message file entry template.
Figure 4B:
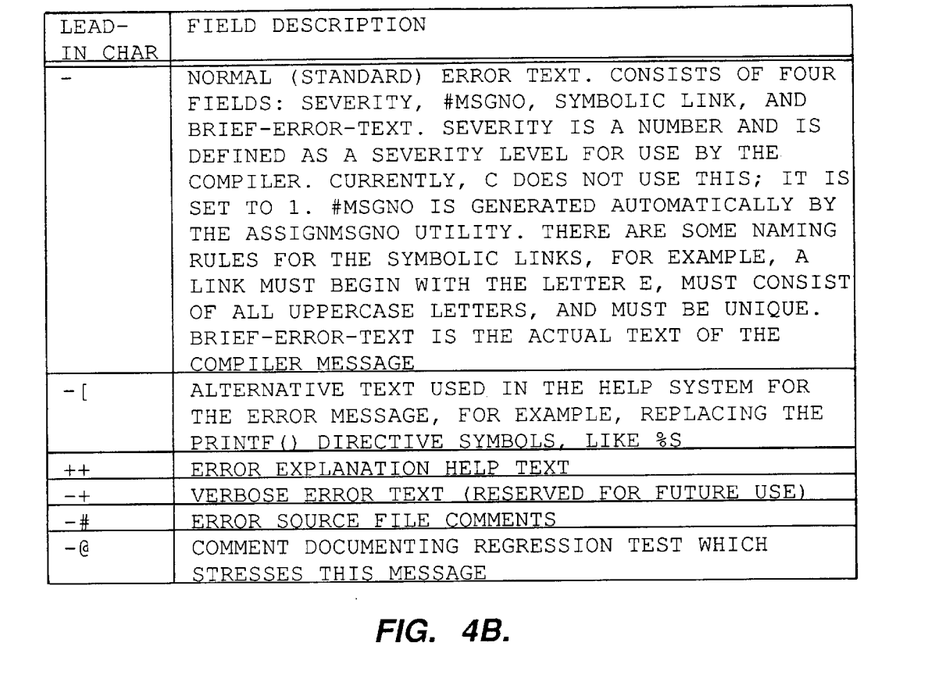
FIG. 4B is a table of lead-in characters and field descriptions.

In order for PREPERR to process the master message file 10 each entry is entered according to a template for the message and its associated information. FIGS. 4A and 4B are, respectively, the template and a table explaining the functions of the template "lead-in" characters.

Referring to FIG. 4A, for the lead in character "–", the four fields are severity; #msgno, symbolic link or handle, and brief error text. For the lead in character "–[" alternative message text 41 which is displayed as the help message is entered.

Figure 5:
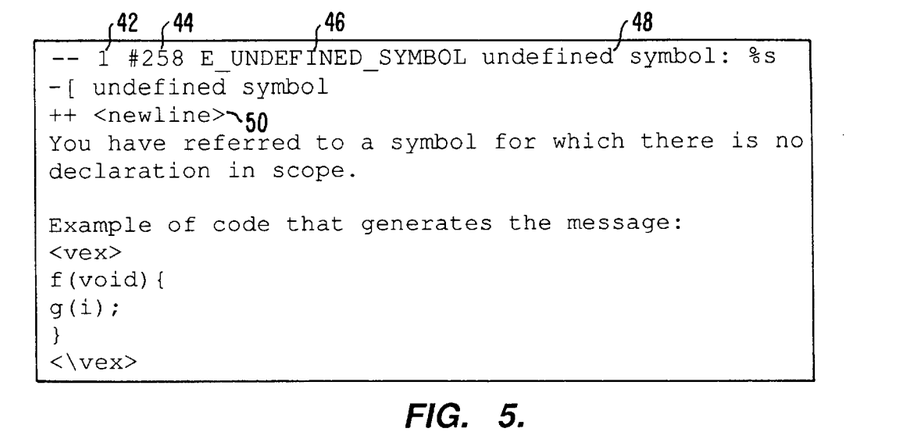
FIG. 5 is an master message file entry.

An example of an entry in the master message file 10 is depicted in FIG. 5. The severity field 42 is "1"; the #msgno 44 field is "#258"; the symbolic link 46 is "E_UNDEFINED_SYMBOL" and is utilized as the symbolic handle to master message file, and the brief error text 48 is "undefined symbol: % s". Text enclosed by <> is HelpTag markup text and is entered when creating an entry in the master message file 10. The HelpTag markup text comprises SGML (Standard Generalized Markup Language) tags, e.g. the <newline> 50 and is utilized by the CDE to format the help messages displayed in a help window created when using the IPE debugger.

As described above, the template for adding entries to the master message file 10 requires that a writer or engineer include a symbolic link 46 which functions as the symbolic handle identifying the entry. To maintain message numbering from release to release tools are used to number the messages automatically and ensure that renumbering rules, which require that messages are not reused or renumbered, are not violated.

In the preferred embodiment, a message number assignment tool (assignmsgno) is used on the master message file 10 to automatically assign permanent message numbers. When a compiler engineer adds a message, it is added without a permanent number, only a symbolic handle. Just prior to release the message number assignment tool (assignmsgno) is run on the master message file 10 to assign the permanent numbers for the message catalog to produce the enumeration header 12(1) described more fully below with reference to FIG. 6.

Also, in the preferred embodiment a comparison tool (commsg) is utilized when a new message catalog is released with a new version of the compiler source code. The comparison tool (commsg) compares the message catalog with previous release's message catalog to verify that the renumbering rules have not been violated.

Figure 6:
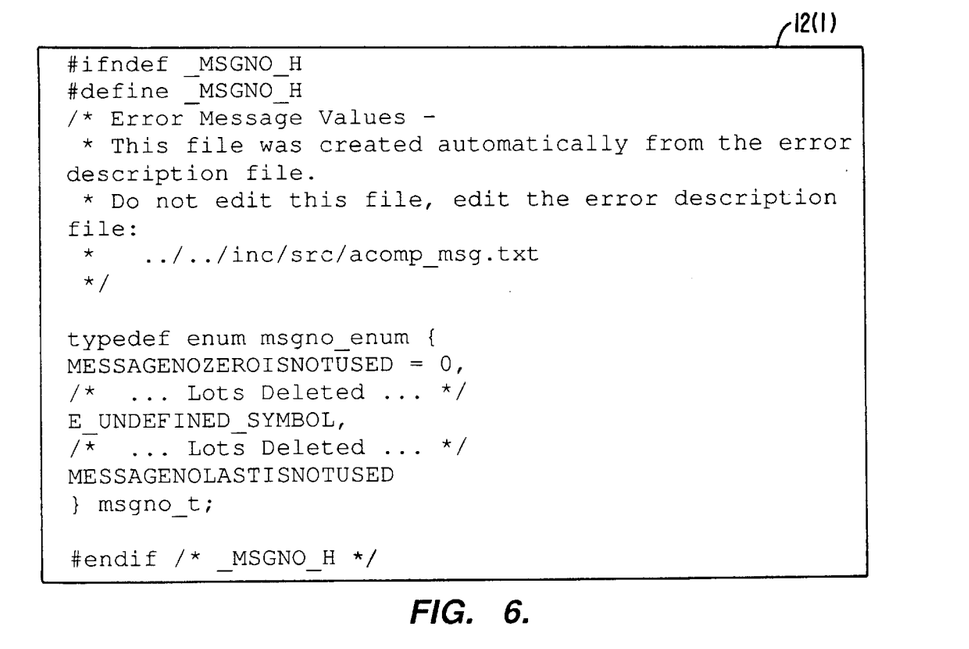
FIG. 6 is part of a compiler enumeration header file.
Figure 7:
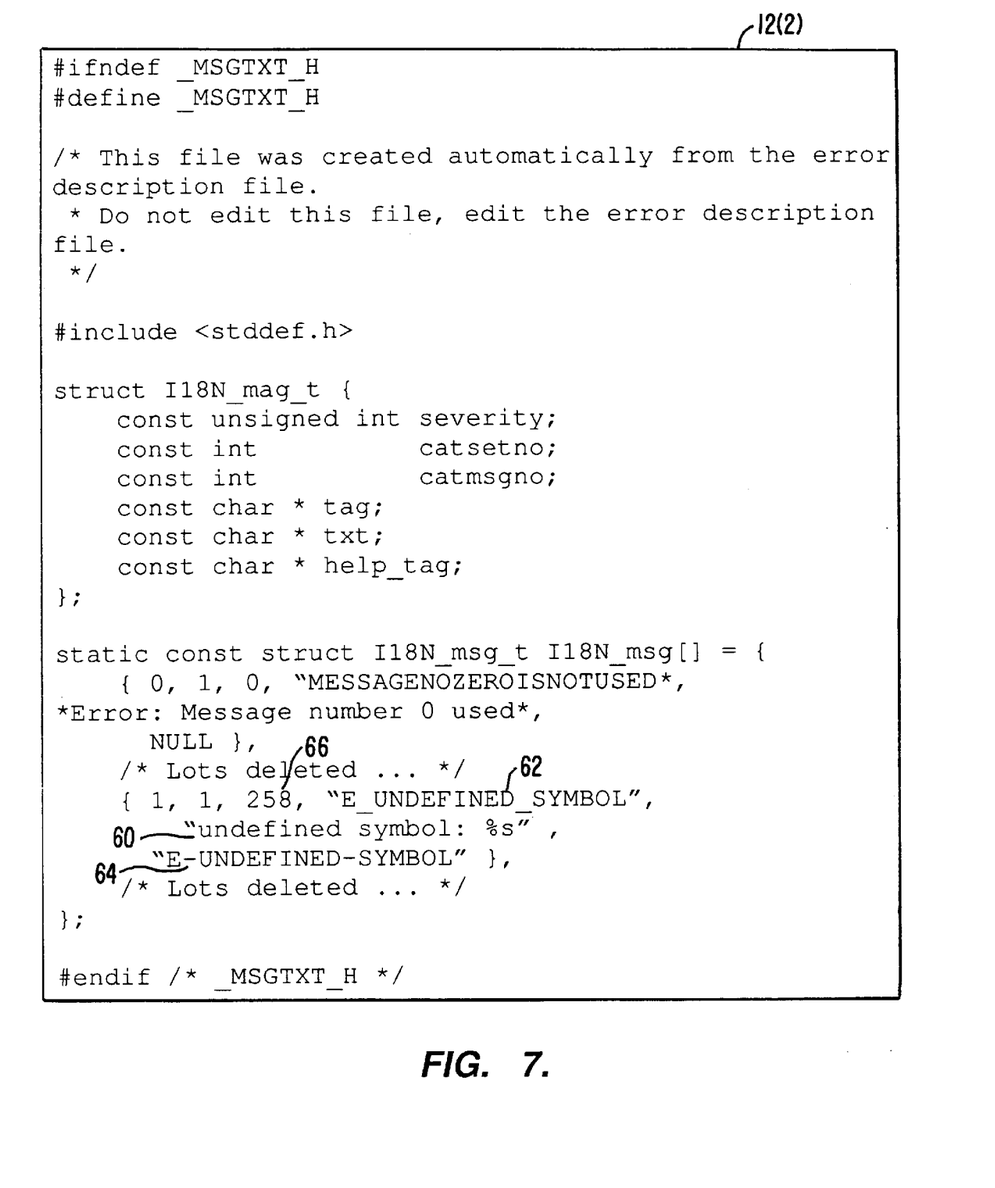
FIG. 7 is part of a compiler message array header file.

Examples of the compiler header files 12 are depicted in FIGS. 6 and 7. The enumeration header 12(1) is depicted in FIG. 6 and contains an enumerated list of the symbolic handles to the messages. As is well-known, the enumerated symbolic handles behave like integers. Thus, the function of enumerating the symbolic handles creates enumerated symbolic handles which are equivalent to integers which function as the message numbers (msgno) assigned to entries in the master message file.

The message array 12(2) is depicted in FIG. 7 and contains an array of message information with each element in the array indexed by an enumerated symbolic handle (msgno). Each entry of the array has the text of the message 60, symbolic handle 62, help system topic ID 64, and its message number 66 for CATGETS( ). The message number is the enumerated symbolic handle created by the enumeration header file 12(1). The help system topic ID 64 is required because the help volume in the preferred embodiment could not handle the underscore character and is case insensitive. The symbolic handle 62 is therefore converted into a help system topic ID 64. The header files contain all the information needed by the compiler for any messages.

Figure 8:
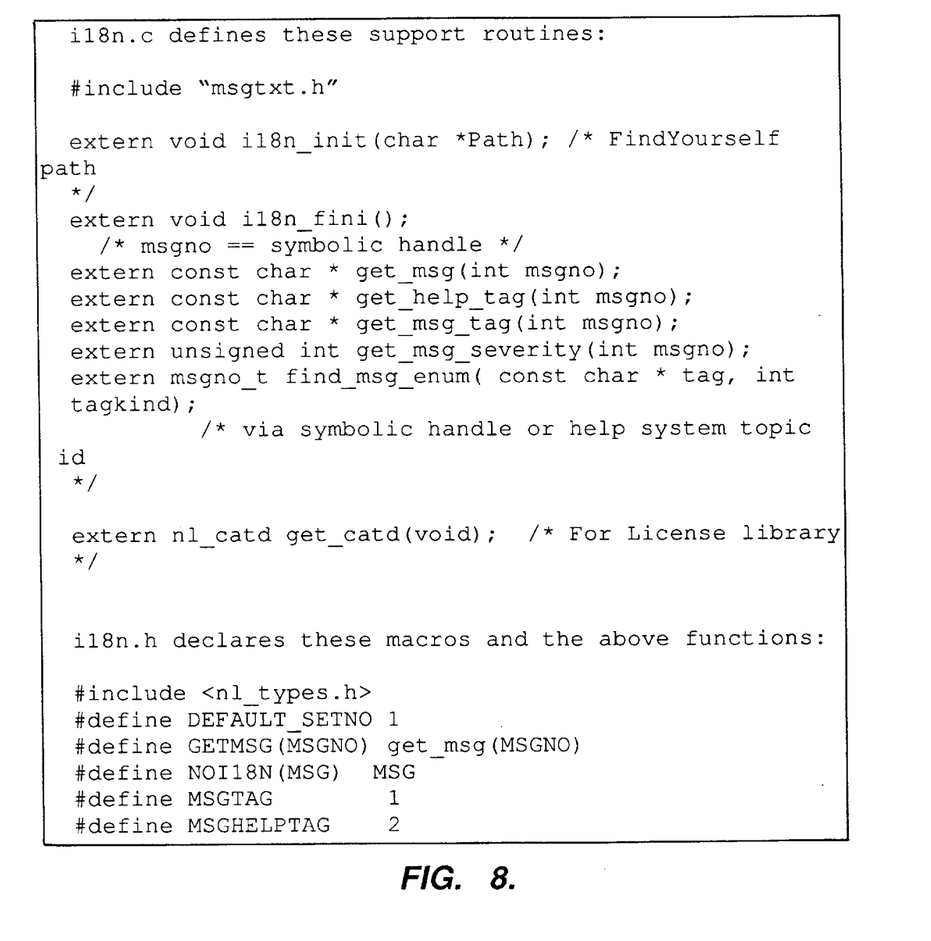
FIG. 8 depicts message handling interface routines.

The definition of the compiler interface routines used in the preferred embodiment to access information on a message stored in the header files 12 produced from the master message file 10 are set out in FIG. 8. These interface routines are defined in a single message source file which also includes the message array 12(2). Each of these interface routines return information from an array element indexed by the message number (msgno) provided as an argument to the interface routine where the enumerated symbolic handle functions as msgno. For example, the routine get_msg(int msgno) returns the message text from the array element indexed by msgno. The routine get_helptag(int msgno) returns the help tag from the array element indexed by msgno. The helptag is used by the CDE to access the correct help message from the help volume 16. Thus, only the single message source file is utilized by the compiler to interface with the messaging system.

Figure 9:
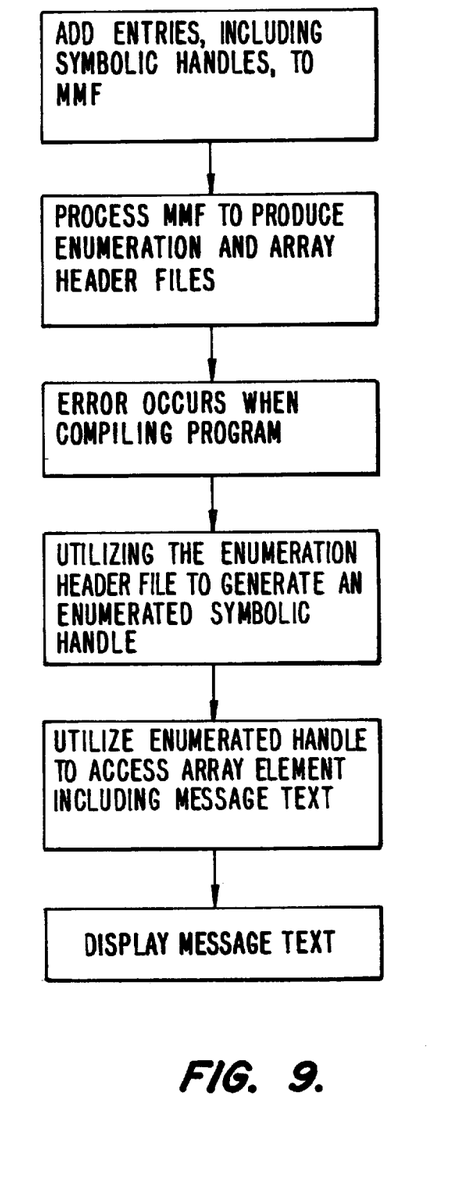
FIG. 9 is a flow chart depicting the steps of generating a message.

FIG. 9 is a flow chart of a procedure for generating and displaying an error message. Entries are added to the master message file 10 as described above. Prior to releasing the master message file 10 the PREPERR tool produces the header files 12 which are utilized by the compiler to generate error messages and links to online help messages. If an error occurs when compiling a program the compiler utilizes the enumeration header file 12(1) to generate an enumerated symbolic handle indexing the array element including the error message. The enumerated symbolic handle is utilized to access an array element including all information needed to generate the error message which is then displayed to the user.

In the preferred embodiment a help system topic ID is included in the array header 12(2) and utilized as part of the file name specified by the HREF=attribute of the anchor link to the help text message included in the HTML (FIG. 12) produced by the compiler. As described above, in preferred embodiment the help system topic ID is required because the help volume can not handle the underscore character and is case insensitive. The symbolic handle 62 is therefore converted into a help system topic ID 64.

The production of online help files will now be described with reference to FIG. 10 which is a depiction of the help output file structure and FIG. 11 which is a flow chart depicting the steps for producing the files depicted in FIG. 10. The help files for the compiler consist of:

1. The help volume 50 used to provide help on error messages in a Build Output window (BOW) which is part of the IPE and displays an HTML file; and 2. The ASCII text file of those same error messages, available for those choosing not to use IPE, or for those who must use the command-line interface.

Figure 10:
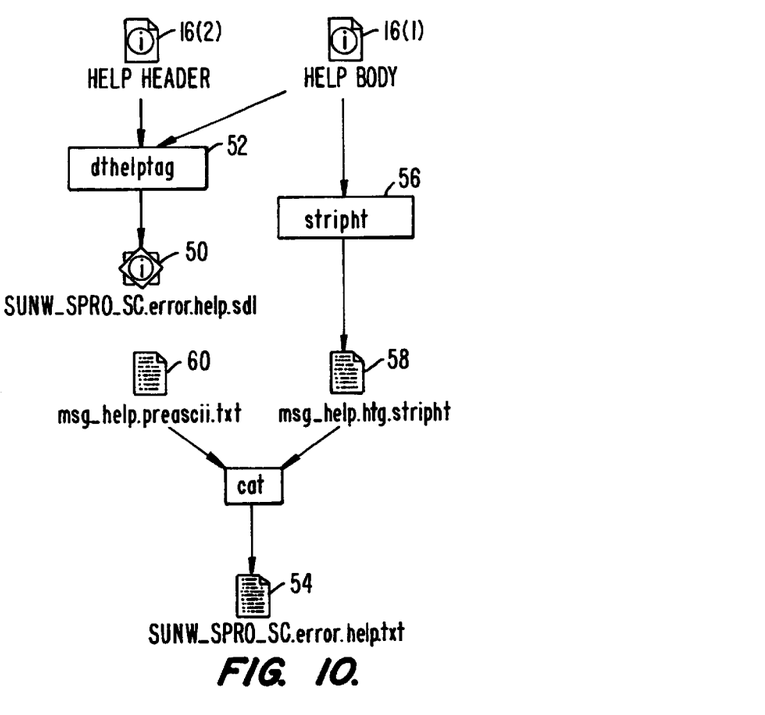
FIG. 10 depicts the production of online help files.
Figure 11:
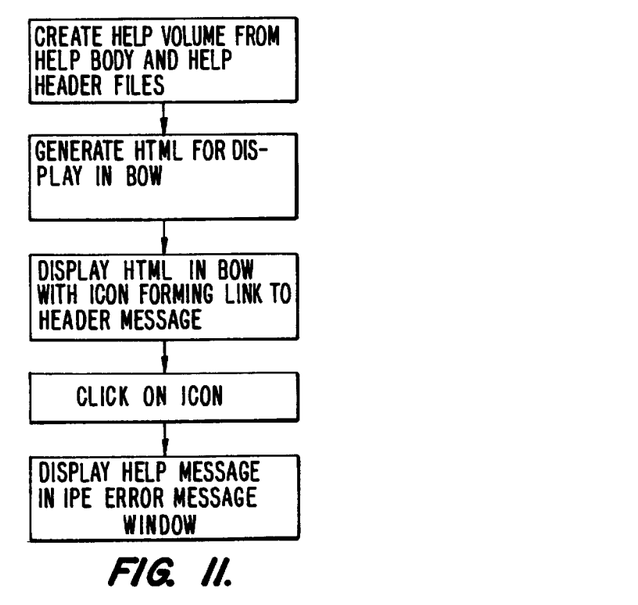
FIG. 11 is a flow chart depicting the steps of generating a help message.

Turning first to the BOW environment, and referring to FIGS. 10 and 11, the help volume (SUNW_PRO_SC.error.help.sdl) 50 is built using the help compiler dthelptag 52 operating on the Help Body 16(1) and Help Header 16(2) to build the help volume 50.

In order for a user to utilize IPE to access online help for an error message displayed in the BOW, a link is provided to the help error message. The error message is produced in HTML by the compiler for use in the BOW from information included in the header files 12 produced from the master message file 10.

Figure 12:
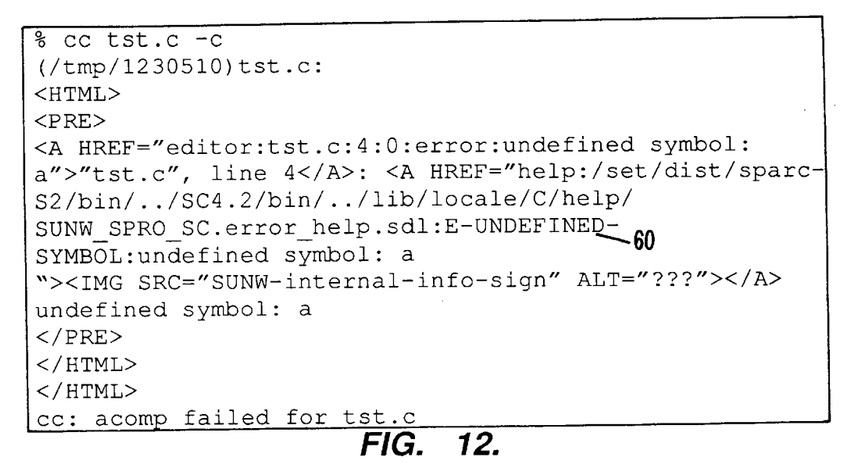
FIG. 12 depicts C compiler error message HTML.
Figure 13:
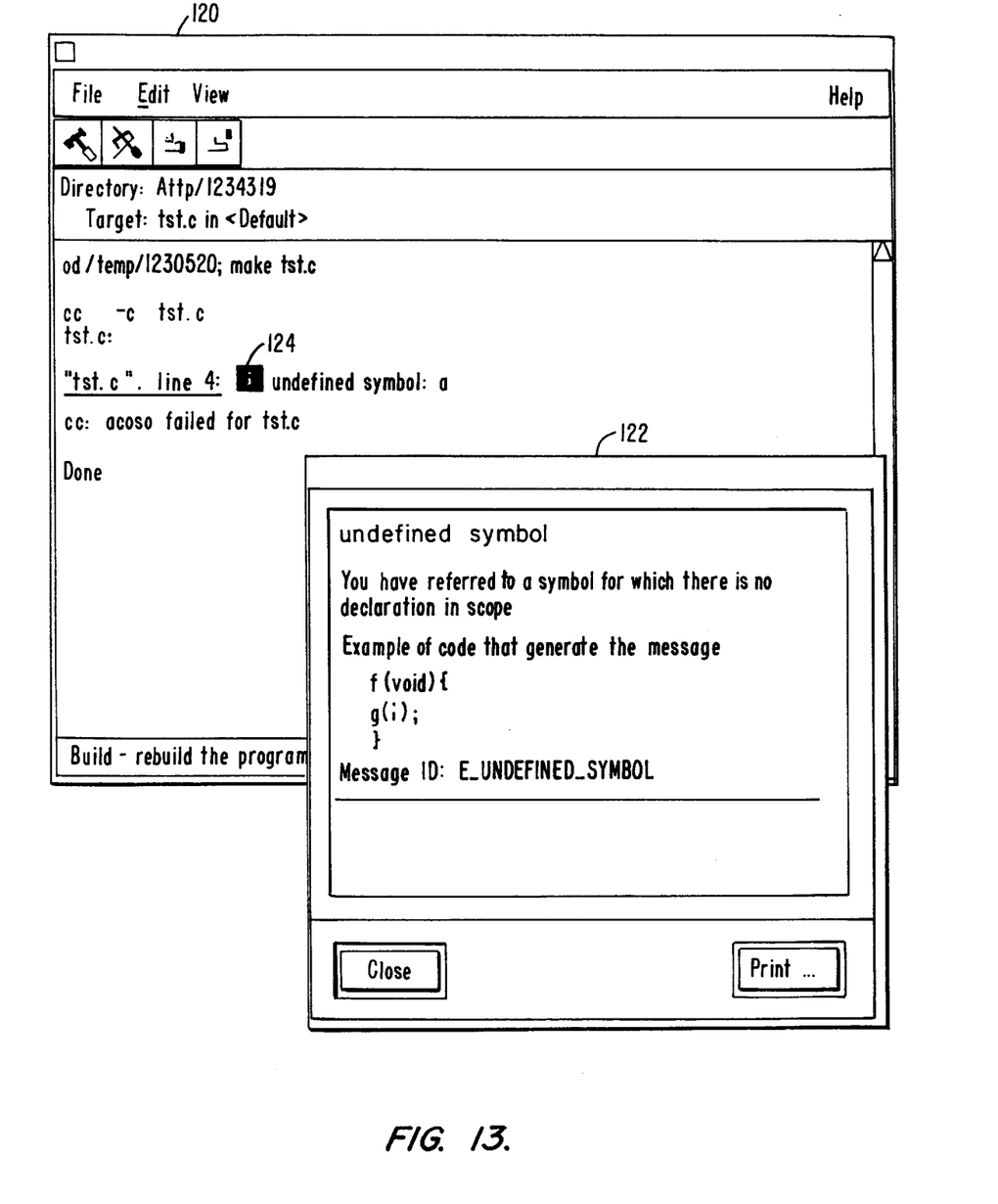
FIG. 13 depicts a build output window and error message window.

FIG. 12 is an example of compiler message HTML and FIG. 13 depicts the HTML of FIG. 11 displayed in the BOW 120 and the error message depicted in the IPE error message help window 122. The link to the error message from help volume 50 is built utilizing information stored in the array header file 12(2).

If a user compiles a program in a Build Output Window any errors are displayed in that window 120. Clicking on the underlined text of the error message displays the line of the source code containing the error. Clicking on an information glyph (icon) 124 displays the online help for the error message in the IPE error message help window 122. Note that the error message is the alternative text 41 entered in the message template.

Figure 14:
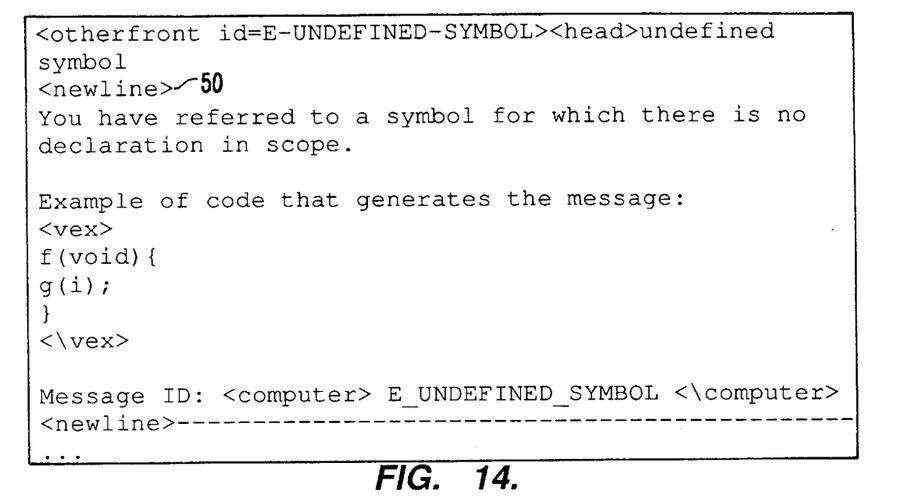
FIG. 14 depicts a portion of a Help Body file.

Referring back to FIG. 10, the online ASCII file (SUNW_SPRO_SC.error.help.txt) 54 is produced via a script (stripht) 56 which strips the HelpTag markup, e.g., <newline> 50 of FIG. 14, from the Help Body file 16(1) to produce a stripped file (msg_help.htg.stripht) 58. For example, the ASCII file 54 has some header text (msg_help.preascii.txt) 60 added to introduce the file and make it more coherent.

Figure 15:
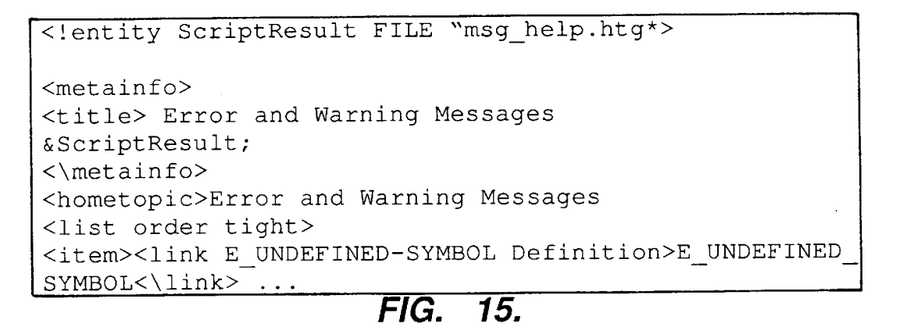
FIG. 15 depicts a portion of a Help Header file.
Figure 16:
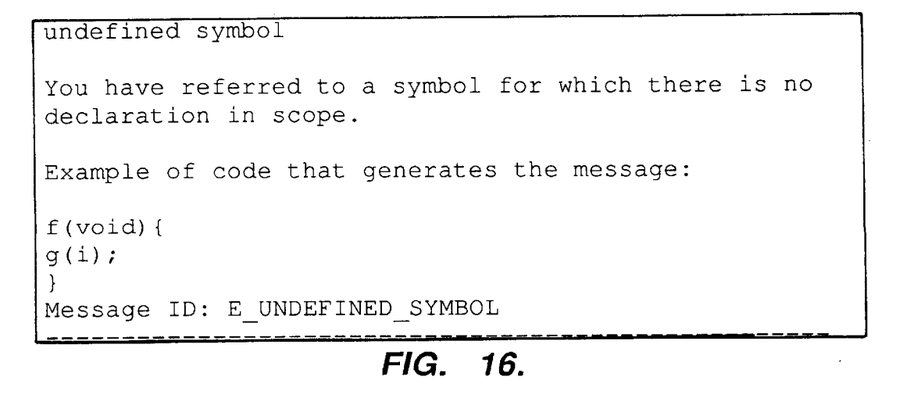
FIG. 16 depicts an ASCII file help message.

Exemplary files contained in the Help Body 16(1) and Help Header 16(2) are depicted, respectively, in FIGS. 14 and 15. The ASCII file help, which is the stripped version of the Help Body depicted in FIG. 14, is depicted in FIG. 16.

In the preferred embodiment the message management system described herein is implemented on the computer system 210 of FIG. 1.

The invention has now been described with reference to the preferred embodiments. Alternatives and substitutions will now be apparent to persons of skill in the art. For example, HTML instead of HelpTag could be utilized in the help volumes depending on interface utilized to display the help messages. Additionally, the same methodology described above for managing messages can be used to manage compiler options. The options would be maintained in a master file and all other files would be derived from the master file. Accordingly it is not intended to limit the invention except as provided by the appended claims.

What is claimed is:

1. A computer implemented message management method based on a single master message file holding the text for all messages and supporting information in one place, with the master message file having a plurality of message entries, each including a symbolic handle, message text, and help message text, the message management method comprising the steps of:

producing compiler header files from said master message file;

providing a symbolic handle of required message information to be displayed;

processing said provided symbolic handle and said header files to access said required information;

displaying the required message information accessed from said header files;

producing a help volume from said master message file, with said help volume having a plurality of entries each including help message text and a help message ID;

utilizing an accessed symbolic handle included in said required message information accessed from said array to specify an entry in said help volume holding required help message text associated with said required message information; and selectively displaying said required help message text in response to user input.

2. A computer-implemented message management method based on a single master message file holding the text for all messages and supporting information in one place, with the master message file having a plurality of message entries, each including a symbolic handle, message text, and help message text, the message management method comprising the steps of:

producing compiler header files from said master message file, said compiler header files including an enumeration header file enumerating the symbolic handles of the entries in the master message file to create enumerated symbolic handles that act as integers, and a message array file having array elements, indexed by enumerated symbolic handles, with each array element including information from a master message file entry including the symbolic handle utilized to access the array;

utilizing said enumeration header file to create a indexing enumerated symbolic handle of required message information to be displayed;

utilizing said indexing enumerated symbolic handle to access an specified array element in said message array file, with an accessed array element including said required message information;

displaying the required message information included in said specified array element;

producing a help volume from said master message file, with said help volume having a plurality of entries each including help message text and a help message ID;

utilizing an included symbolic handle included in said specified array element to specify an entry in said help volume holding required help message text associated with said required message information; and selectively displaying said required help message text in response to user input.

3. The method of claim 2 further comprising the step of:

producing a message catalog from said master message file for use by localization teams and for verification of message numbering.

4. The method of claim 2 further comprising the step of:

including a template in said master message file including lead-in characters for defining different portions of an master message file entry.

5. The method of claim 2 wherein said step of utilizing further comprises the steps of:

forming an HTML link utilizing information derived from said included symbolic handle; and displaying said HTML link with the required message information.

6. A computer-implemented message management method comprising the steps of:

providing a single master message file holding the text for all messages and supporting information in one place, with the master message file having a plurality of message entries, each including a symbolic handle, message text, and help message text;

producing compiler header files from said master message file, said compiler header files including an enumeration header file enumerating the symbolic handles of the entries in the master message file and a message array file having array elements, indexed by enumerated symbolic handles, with each array element including information from an master message file entry including the symbolic handle utilized to access the array;

utilizing said enumeration header file to create an indexing enumerated symbolic handle of required message information to be displayed;

utilizing said indexing enumerated symbolic handle access an specified array element in said message array file, with an accessed array element including said required message information;

displaying the required message information included in said specified array element;

producing a help volume from said master message file, with said help volume having a plurality of entries each including help message text and a help message ID;

utilizing an included symbolic handle included in said specified array element to specify an entry in said help volume holding required help message text associated with said required message information; and selectively displaying said required help message text in response to user input.

7. A computer program product article of manufacture comprising:

a computer usable medium having a computer readable code embodied thereon for managing messages based on information stored in a single master message file holding the text for all messages and supporting information in one place, with the master message file having a plurality of message entries, each including a symbolic handle, message text, and help message text, the computer program product further comprising:

computer readable program code devices configured to cause a computer to effect production compiler header files from said master message file, said compiler header files including an enumeration header file enumerating the symbolic handles of the entries in the master message file and a message array file having array elements, indexed by enumerated symbolic handles, with each array element including information from an master message file entry including the symbolic handle utilized to access the array;

computer readable program code devices configured to cause a computer to effect utilizing said enumeration header file to create an indexing enumerated symbolic handle of required message information to be displayed;

computer readable program code devices configured to cause a computer to effect utilizing said indexing enumerated symbolic handle access an specified array element in said message array file, with an accessed array element including said required message information;

computer readable program code devices configured to cause a computer to effect displaying the required message information included in said specified array element;

computer readable program code devices configured to cause a computer to effect producing a help volume from said master message file, with said help volume having a plurality of entries each including help message text and a help message ID;

computer readable program code devices configured to cause a computer to effect utilizing an included symbolic handle included in said specified array element to specify an entry in said help volume holding required help message text associated with said required message information; and computer readable program code devices configured to cause a computer to effect selectively displaying said required help message text in response to user input.

8. The computer program product of claim 7 further comprising:

the computer readable program code devices configured to cause a computer to effect producing a message catalog from said master message file for use by localization teams and for verification of message numbering.

9. The computer program product of claim 7 further comprising:

computer readable program code devices configured to cause a computer to effect forming an HTML link utilizing information derived from said included symbolic handle; and computer readable program code devices configured to cause a computer to effect displaying said HTML link with the required message information.

10. A computer system comprising:

a computer readable storage medium for storing a single master message file holding the text for all messages and supporting information in one place, with the master message file having a plurality of message entries, each including a symbolic handle, message text, and help message text;

a display for displaying messages and help messages to a user; and a processing system that is configured to process said master message file and display messages and help text by virtue of being configured to:

produce compiler header files from said master message file, said compiler header files including an enumeration header file enumerating the symbolic handles of the entries in the master message file and a message array file having array elements, indexed by enumerated symbolic handles, with each array element including information from an master message file entry including the symbolic handle utilized to access the array;

utilize said enumeration header file to create a indexing enumerated symbolic handle of required message information to be displayed;

utilize said indexing enumerated symbolic handle to access a specified array element in said message array file, with an accessed array element including said required message information;

display the required message information included in said specified array element on said display;

produce a help volume from said master message file, with said help volume having a plurality of entries each including help message text and a help message ID;

utilize an included symbolic handle included in said specified array element to specify an entry in said help volume holding required help message text associated with said required message information;

selectively displaying said required help message text in response to user input on said display.

* * * * *